US010865324B2

(12) United States Patent
Li et al.

(10) Patent No.: US 10,865,324 B2
(45) Date of Patent: Dec. 15, 2020

(54) HYBRID LATEX EMULSIONS AND COATING COMPOSITIONS FORMED FROM HYBRID LATEX EMULSIONS

(71) Applicant: Akzo Nobel Coatings International B.V., Arnhem (NL)

(72) Inventors: Cathy Li, Solon, OH (US); Timothy I. Memmer, Strongsville, OH (US); Derek Scavuzzo, Akron, OH (US); Daniel Bode, Cleveland, OH (US)

(73) Assignee: Akzo Nobel Coatings International B.V., Arnhem (NL)

( * ) Notice: Subject to any disclaimer, the term of this patent is extended or adjusted under 35 U.S.C. 154(b) by 879 days.

(21) Appl. No.: 14/772,947

(22) PCT Filed: Mar. 11, 2014

(86) PCT No.: PCT/EP2014/054625
§ 371 (c)(1),
(2) Date: Sep. 4, 2015

(87) PCT Pub. No.: WO2014/139973
PCT Pub. Date: Sep. 18, 2014

(65) Prior Publication Data
US 2016/0017171 A1 Jan. 21, 2016

Related U.S. Application Data

(60) Provisional application No. 61/781,565, filed on Mar. 14, 2013.

(30) Foreign Application Priority Data

Jun. 7, 2013 (EP) ..................................... 13171104

(51) Int. Cl.
C09D 143/04 (2006.01)
C08G 77/00 (2006.01)
C08F 220/00 (2006.01)
C09D 4/00 (2006.01)
C09D 183/00 (2006.01)
C09D 5/02 (2006.01)
C09D 151/00 (2006.01)
C08L 83/00 (2006.01)

(52) U.S. Cl.
CPC .......... C09D 143/04 (2013.01); C08F 220/00 (2013.01); C08G 77/00 (2013.01); C09D 4/00 (2013.01); C09D 5/022 (2013.01); C09D 151/00 (2013.01); C09D 183/00 (2013.01); C08L 83/00 (2013.01)

(58) Field of Classification Search
CPC ....... C08F 220/00; C08G 77/00; C08L 83/00; C09D 143/04; C09D 5/022
USPC ....................................................... 524/837
See application file for complete search history.

(56) References Cited

U.S. PATENT DOCUMENTS

| 3,449,293 | A | | 6/1969 | Burzynski et al. |
| 3,575,910 | A | | 4/1971 | Thomas et al. |
| 3,808,287 | A | | 4/1974 | Thomas et al. |
| 4,539,348 | A | | 9/1985 | Gajria et al. |
| 4,822,828 | A | | 4/1989 | Swofford |
| 5,128,391 | A | | 7/1992 | Shustack |
| 5,244,959 | A | * | 9/1993 | Hazan .................. C09D 143/04 524/504 |
| 5,252,660 | A | | 10/1993 | Hazan et al. |
| 5,482,994 | A | | 1/1996 | Liles et al. |
| 6,069,200 | A | * | 5/2000 | Chen .................... C08L 101/10 524/504 |
| 6,265,029 | B1 | | 7/2001 | Lewis |
| 6,326,422 | B1 | * | 12/2001 | Horwatt .................. C08K 3/22 524/261 |
| 9,404,006 | B2 | * | 8/2016 | Li ............................ C08J 3/245 |
| 2001/0032568 | A1 | * | 10/2001 | Schutt ...................... C09D 4/00 106/287.11 |
| 2006/0135684 | A1 | | 6/2006 | Killilea |
| 2009/0035587 | A1 | | 2/2009 | Killilea et al. |

(Continued)

FOREIGN PATENT DOCUMENTS

CN 101121771 A 2/2008
CN 102649835 A 8/2012

(Continued)

OTHER PUBLICATIONS

International Search Report and Written Opinion of International Application No. PCT/EP2014/054625, dated Mar. 31, 2014.

(Continued)

Primary Examiner — Michael A Salvitti
(74) Attorney, Agent, or Firm — Pauly, DeVries Smith & Deffner LLC

(57) ABSTRACT

Hybrid latex emulsions are disclosed which can be used in the formation of coating compositions having good blush resistance, abrasion resistance, blister resistance, hardness and scratch resistance. In some embodiments, the coating compositions are used to coat substrates such as cans and packaging materials for the storage of food and beverages. Hybrid latex emulsions of the invention may be prepared by mixing an ethylenically unsaturated monomer component and a stabilizer in a carrier to form a monomer emulsion, and reacting the monomer emulsion with an initiator to form the hybrid latex emulsion. The ethylenically unsaturated monomer component may include an organosilane compound, which may include a reactive organic group and a hydrolysable inorganic alkoxysilane.

19 Claims, No Drawings

(56) References Cited

U.S. PATENT DOCUMENTS

| | | | | |
|---|---|---|---|---|
| 2010/0056696 | A1* | 3/2010 | Poole | C09D 131/04 524/501 |
| 2011/0117296 | A1* | 5/2011 | Jang | C09J 133/062 428/1.33 |
| 2012/0152754 | A1 | 6/2012 | Schlosser et al. | |
| 2016/0017171 | A1* | 1/2016 | Li | C09D 4/00 428/35.7 |
| 2016/0024325 | A1* | 1/2016 | Li | C08J 3/245 524/247 |

FOREIGN PATENT DOCUMENTS

| | | | |
|---|---|---|---|
| EP | 2 599 844 | A1 | 6/2013 |
| EP | 2599844 | | 6/2013 |
| JP | H07-232410 | A | 9/1995 |
| JP | 200080212 | | 3/2000 |
| JP | 2001-311037 | A | 11/2001 |
| WO | 2008090458 | | 7/2008 |
| WO | 2010/097353 | A1 | 9/2010 |
| WO | 2010097353 | | 9/2010 |
| WO | 2012/089747 | A1 | 7/2012 |
| WO | 2012089657 | | 7/2012 |
| WO | 2014140057 | | 9/2014 |

OTHER PUBLICATIONS

Search Report of EP Application No. 13171104.6, dated Oct. 29, 2013.
Rodriguez et al., "The Correction of Silicone Incorporation into Hybrid Acrylic Coatings with the Resulting Hydrophobic and Thermal Properties," published in *Macromolecules*, 2008.
Witucki, "A Silane Primer: Chemistry and Applications of Alkoxy Silanes," presented at the 57$^{th}$ Annual Meeting of the Federation of Societies for Coatings Technology, on Oct. 21, 1992.
Chen et al., "Silanes in High-Solids and Waterborne Coatings," Ductile Polymers: Rice introduced the ductile fracture energy to the equation, presented at the Waterborne High-Solids and Powder Coatings Symposium Feb. 14-16, 1996.
Akin, "Synthesis and Characterization of Waterborne Silane Coupling Agent Containing Silicone-Acrylic Resin," submitted to the Graduate School of Natural and Applied Sciences Middle East Technical University, Sep. 2004.
"Silane curing agents in waterborne coatings" European Coatings Journal, http://www.european-coatings.com/Editorial-archive/Silane-curing-agents-in-waterborne-coatings, Jul. 1, 1998.
"Silane Coupling Agents," Shin-Etsu Silicone Marketing Document published Jul. 2012 (24 pages).
"Silquest* Silanes, Selector and Handling Guide," Momentive product and potential application brochure published Mar. 2011 (11 pages).

* cited by examiner

HYBRID LATEX EMULSIONS AND COATING COMPOSITIONS FORMED FROM HYBRID LATEX EMULSIONS

This application is a national stage filing under 35 U.S.C. § 371 of PCT/EP2014/054625, filed Mar. 11, 2014, which claims priority to U.S. Provisional Patent Application No. 61/781,565 filed Mar. 14, 2013, and European Patent Application No. 13171104.6, filed Jun. 7, 2013, the contents of which herein incorporated by reference to the extent not inconsistent with the present disclosure.

BACKGROUND OF THE INVENTION

1. Field of the Invention

The present invention relates to hybrid latex emulsions, coating compositions formed from hybrid latex emulsions, methods of coating substrates with the coating compositions, and substrates coated with the coating compositions.

2. Description of Related Art

Coating compositions formed from epoxy resins have been used to coat packaging and containers for foods and beverages. Although the weight of scientific evidence, as interpreted by the major global regulatory food safety agencies in the US, Canada, Europe, and Japan, shows that the levels of bisphenol A consumers are exposed to with current commercial epoxy based coatings is safe, some consumers and brand owners continue to express concern, and a coating that does not contain bisphenol A or any other endocrine disruptor is desirable.

Commonly-owned WO 2010/97353 describes the preparation of latex emulsions used in coating compositions useful for packaging coating beverage inside spray applications. Commonly-owned patent publication WO 2012/089747 describes the preparation of core-shell latex emulsions by for beverage end applications. Such latex emulsions have not achieved the performance of epoxy based coatings and have not been successfully used on a commercial basis as food and beverage coating compositions.

There is a need to produce coating compositions that do not contain bisphenol A or are substantially free of bisphenol A. There is also a need to produce coating compositions that do not contain phenolic resins or are substantially free of phenolic resins.

SUMMARY OF THE INVENTION

The present invention provides an alternate to epoxy resins that still allows formaldehyde and phenolic-free or substantially phenolic-free cure, blush resistance, capability to retort and can withstand hard-to-hold beverages. The coating compositions of the invention can be made with a simple process, not requiring multiple polymers or processing stages to achieve the intended effect.

The hybrid latex emulsions of the invention can be prepared by a sol-gel process to incorporate self-crosslinking functional groups into the hybrid latex emulsion particles to help increase the hybrid latex emulsion particle gel content and blushing resistance. These hybrid latex emulsions can be used in the preparation of coating compositions free or substantially free of phenolic resins suitable, inter alia, as packaging coatings for food and beverage packaging and containers, including beer and beverage external/interior easy-open-ends. Easy-open-ends for beer and beverage containers are typically manufactured by first coating a flat sheet of a metal substrate, heating the coated substrate, and then stamping or shaping the coated substrate into the desired shape. The coatings for beer and beverage can ends may be applied in film weights of about 1 milligram per square inch to about 15 milligrams per square inch on a high speed coil coating line. High speed coil coating lines require a coating material that will dry and cure within a few second as it is heated very rapidly to a peak metal temperature that can range from about 200 to about 300° C.

Organosilane compounds, such as alkoxysilanes, can be incorporated into the hybrid latex emulsions of the present invention to help form self-cross-linkable films. As a result, organosilane-acrylate copolymer hybrid latex emulsions can be prepared with specific properties designed to take advantage of the combined water repellency, non-pollution and thermal stability of organosilane compounds, as well as the mechanical strength and cohesiveness of the acrylic matrix.

While previous literature suggests that organosilane compounds improve adhesion, the current inventors have discovered that the organsilane compound also improves a critical-to-quality parameter for food and beverage packaging and containers, especially coatings for beer and beverage ends. In commonly-owned WO 2010/97353, sterilization resistance was difficult to achieve with a high film thickness. In the current invention with the inclusion of an organosilane compound, the coating composition can have a higher gel content which permits higher film weights while still achieving blush-free films after sterilization. The thicker films of the current invention meet the global requirements for beer and beverage end uses.

The present invention includes methods for preparing stable hybrid organosilane-acrylate copolymer latex emulsions (such as hybrid organosilicon-acrylate copolymer latex emulsions) by emulsion polymerization or mini-emulsion polymerization. In some embodiments of the invention, a hybrid latex emulsion is prepared by a method comprising the steps of mixing an ethylenically unsaturated monomer component and a stabilizer in a carrier to form a monomer emulsion, and reacting the monomer emulsion with an initiator to form the hybrid latex emulsion, wherein the ethylenically unsaturated monomer component comprises an organosilane compound and at least one ethylenically unsaturated monomer which is not an organosilane compound. The mixing of ethylenically unsaturated monomer component and stabilizer in the carrier can be performed using a high shear Ross mixer for about 10 minutes at medium speed and then about another 10 minutes at high speed (>10,000 rpm) to achieve stable particles. This mixture, along with an initiator solution, can be pumped into a reactor to form hybrid latex emulsions.

In some embodiments of the invention, a hybrid latex emulsion is used itself as a coating composition or used in the formation of a coating composition for food and beverage packaging and containers. In some embodiments of the invention, the hybrid latex emulsion can be blended with an organosilane compound, such as a colloidal silica dispersion, to improve blush resistance, abrasion resistance, blister resistance, hardness and scratch resistance. In addition, the hybrid latex emulsions and the coating compositions of the invention may also be prepared without a phenolic compound.

The present invention also includes methods of coating substrate with a coating composition having a hybrid latex emulsions and substrates coated with the coating compositions.

DETAILED DESCRIPTION OF THE INVENTION

The present invention includes substrates coated at least in part with a coating composition of the invention and methods for coating the substrates. The term "substrate" as used herein includes, without limitation, cans, metal (such as aluminum) cans, beer and beverage easy-open-ends, packaging, containers, receptacles, or any portions thereof used to hold, touch or contact any type of food or beverage. Also, the terms "substrate", "food can(s)", "food containers" and the like include, for non-limiting example, "can ends", which can be stamped from can end stock and used in the packaging of beverages.

The present invention includes methods for preparing a hybrid latex emulsion by mixing an ethylenically unsaturated monomer component and a stabilizer in a carrier to form a monomer emulsion, and reacting the monomer emulsion with an initiator to form the hybrid latex emulsion, wherein the ethylenically unsaturated monomer component comprises an organosilane compound and at least one ethylenically unsaturated monomer which is not an organosilane compound. In some embodiments, the organosilane compound is present in an amount from about 0.1 to about 30% by weight of total polymer solids in the hybrid latex emulsion. In some embodiments, the stabilizer is present in an amount of about 0.1% to about 5.0% by weight of total polymeric solids in the hybrid latex emulsion.

In some embodiments of the invention, a hybrid latex emulsion is prepared by mini-emulsion polymerization. In such a process, the ethylenically unsaturated monomer component, stabilizer and carrier can be mixed using a high shear Ross mixer for about 10 minutes at medium speed and then about another 10 minutes at high speed (>10,000 rpm) to achieve stable particles. This mixture, along with an initiator solution can be pumped into a reactor to form a hybrid latex emulsion.

In some embodiments of the invention, a hybrid core-shell latex emulsion can be prepared from an ethylenically unsaturated monomer component, a stabilizer comprising a strong acid and an initiator. The ethylenically unsaturated monomer component may include an organosilane compound that becomes present in the core or in the shell of the hybrid core-shell latex emulsion. The hybrid core-shell latex emulsions of the present invention may comprise a homogenous latex particle structure and/or an inhomogeneous latex particle structure. The core-shell latex particle structure may be controlled by the polymerization processes. Such particle structures are usually prepared by a series of consecutive emulsion polymerization sequences with different monomer types, where the second stage monomer is polymerized in the presence of seed latex particles. In some embodiments, the hybrid latex emulsion is reacted with a neutralizer to form a coating composition.

The hybrid latex emulsions of the invention may be prepared using an ethylenically unsaturated monomer component having an organosilane compound and at least one ethylenically unsaturated monomer which is not an organosilane compound. The organosilane compound may include without limitation 3-trimethoxysilyl propyl methacrylate (MPS), 3-methacryloxypropyltrimethoxysilane, 3-glycidyloxypropyltriethoxysilane, 3-glycidyloxypropyltrimethoxysilane, aminoethylaminopropyltrimethoxysilane, vinyltriethoxysilane (VTES), tetramethoxysilane, tetraethoxysilane, methyltrimethoxysilane, colloidal silica, inorganic silica particles, and the like, or a combination thereof.

When VTES or MPS for example are present in the ethylenically unsaturated monomer component mixture, three sets of chemical reaction can occur simultaneously (depending on reaction conditions such as pH, temperature and monomer compositions). First, an organosilane silane monomer (such as MPS) can be incorporated into the polymer chain by the free radical copolymerization reaction depicted in Scheme 1 below. In Scheme 1, R1 can be hydrogen or a methyl group, R2, R3 and R4 can each be a methyl, an ethyl, an isopropoxy or a phenyl group, R5 can be hydrogen, a methyl, an ethyl, a butyl, or a 2-ethylhexyl group, such as a 2-hydroxyethyl or a hydroxyl propyl group. The polymerization reaction may include both a radical polymerization reaction of acrylate monomers and a hydrolysis condensation reaction of the organosilane compound. Second, the trimethoxysilyl groups and the hydroxyl groups in the copolymer can undergo hydrolysis and polycondensation reactions resulting in cross-linking of the hybrid latex emulsions as schematically represented in Scheme 2. In Scheme 2, the amount of organosilane compound incorporated into copolymer chain may depend on the particular surfactant, ethylenically unsaturated monomer component mixture, temperature and pH. The hydrolysis of an alkoxysilane was proven with both acidic and basic catalysts. Good pH control is required to minimize premature cross-linking during polymerization. The minimum hydrolysis rate might occur at a neutral pH for most systems. If a more sterically hindered alkoxysilane is used, for example an alkyltriisopropoxysilane instead of an alkyltrimethoxysilane, less premature cross-linking may result compared to a methacryloxypropyltriisopropoxysilane.

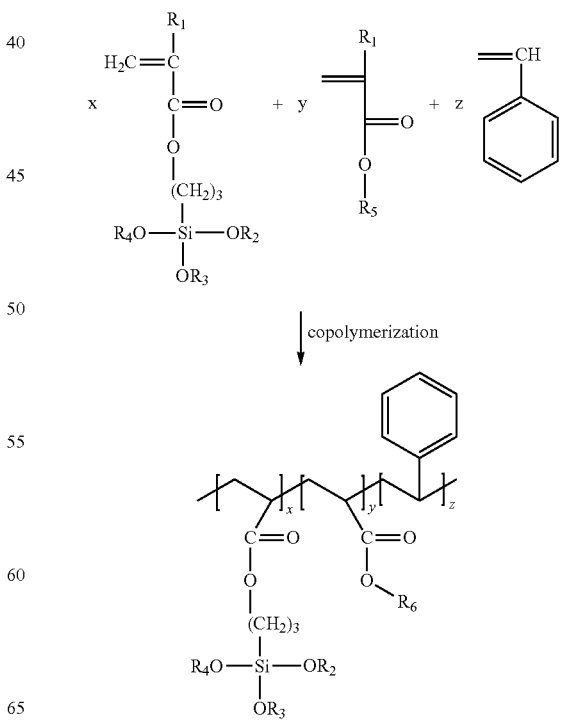

Scheme 1 - Reaction scheme for copolymerization

Scheme 2 - Reaction scheme for the hydrolosis/condensation reaction of hybrid latex

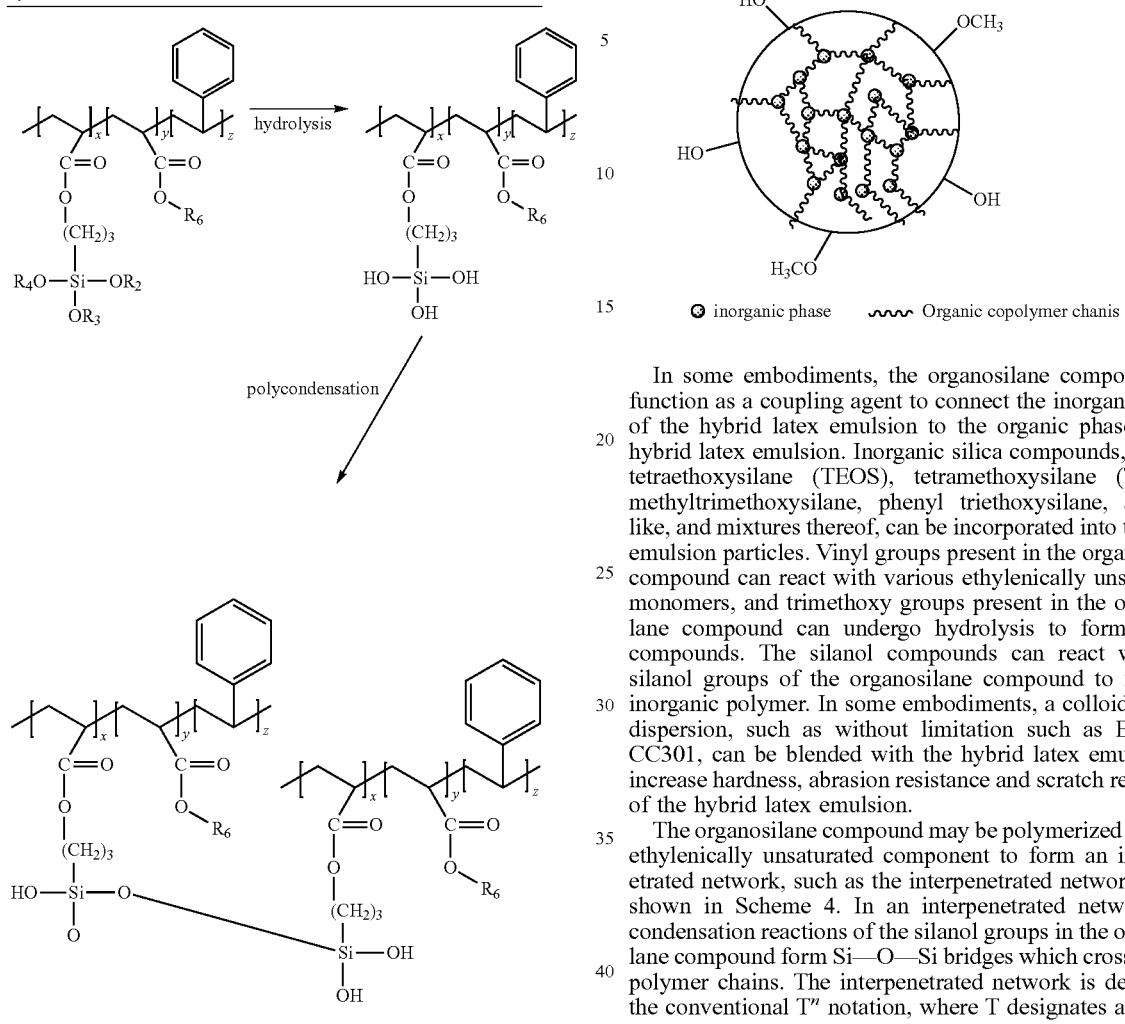

In some embodiments, the hybrid latex emulsion may be neutralized. The neutralizer may include, without limitation, ammonia, a tertiary amine, such as, for non-limiting example, dimethylethanolamine, 2-dimethylamino-2-methyl-1-propanol, tributylamine, or a combination thereof. For non-limiting example, the neutralizer may be employed in an amount up to about 100% based on of the amount of acid to be neutralized in the system.

At a higher pH, silanol groups from the organosilane compound and hydroxyl groups of an acrylate compound from the ethylenically unsaturated monomer component which are present in the latex polymer chain may undergo a condensation reaction. Condensation reaction rates may increase upon increasing the pH and/or the temperature which results in the highly cross-linked interpenetrated networks shown in Scheme 3. Inorganic silica particles from the organosilane compound may disperse in the resulting organic polymer to form hybrid latex emulsion particles. The formation of a silica network can improve the thermal stability, mechanical strength and blush resistance of the hybrid latex emulsion particles in a coated film.

Scheme 3 - Hybrid latex interpenetrated network particle

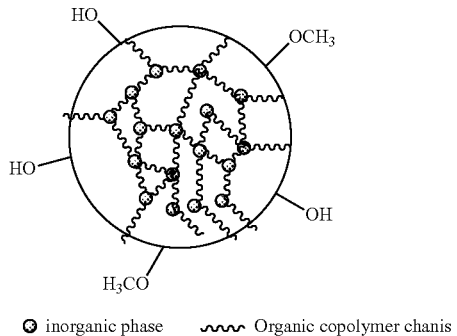

⊙ inorganic phase    ∿∿ Organic copolymer chanis

In some embodiments, the organosilane compound can function as a coupling agent to connect the inorganic phase of the hybrid latex emulsion to the organic phase of the hybrid latex emulsion. Inorganic silica compounds, such as tetraethoxysilane (TEOS), tetramethoxysilane (TMOS), methyltrimethoxysilane, phenyl triethoxysilane, and the like, and mixtures thereof, can be incorporated into the latex emulsion particles. Vinyl groups present in the organosilane compound can react with various ethylenically unsaturated monomers, and trimethoxy groups present in the organosilane compound can undergo hydrolysis to form silanol compounds. The silanol compounds can react with the silanol groups of the organosilane compound to form an inorganic polymer. In some embodiments, a colloidal silica dispersion, such as without limitation such as Bindzil® CC301, can be blended with the hybrid latex emulsion to increase hardness, abrasion resistance and scratch resistance of the hybrid latex emulsion.

The organosilane compound may be polymerized with the ethylenically unsaturated component to form an interpenetrated network, such as the interpenetrated network which shown in Scheme 4. In an interpenetrated network, the condensation reactions of the silanol groups in the organosilane compound form Si—O—Si bridges which crosslink the polymer chains. The interpenetrated network is defined as the conventional $T^n$ notation, where T designates a trifunctional unit, and n is the number of bridging O atoms surrounding the silicon atom. In Scheme 4, $T^0$ can be a trisilanol or a trialkoxysilane. $T^3$ has most cross-linked network in Scheme 4. The interpenetrated network may improve blush and retort resistance for the hybrid latex emulsion.

Scheme 4 - An interpenetrated network

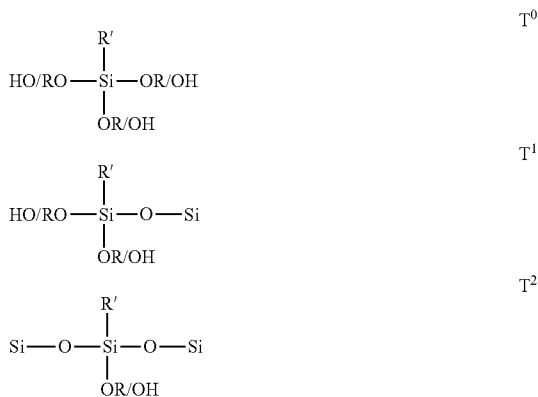

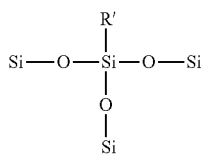

In some embodiments, the organosilane compounds can function as a coupling agent by including one or more reactive organic groups and one or more hydrolysable inorganic groups. The reactive organic group can include a vinyl group, an epoxy group, an amino group, and the like, or a mixture thereof. The hydrolysable inorganic groups can include an alkoxysilyl group. It is contemplated that the dual nature of the organosilane compound allows the organosilane compound to react with both inorganic and organic polymers as shown in Scheme 5.

processes, including for non-limiting example a multi-stage polymerization process. Such particle structures are usually prepared by a series of consecutive emulsion polymerization sequences with different monomer types, where the second stage monomer is polymerized in the presence of seed latex particles.

The coating compositions of the invention are suitable for packaging coating applications, such as beverage end applications with a curing time less than about 15 seconds. In some embodiments, the coating compositions have a gel content greater than about 50 or greater than about 90.

The hybrid latex particle structures of the invention allow for the incorporation of lower levels of acid monomers which contributes to better blush resistance and acceptable adhesion on a substrate. Lower levels of acid monomers, such as amounts of about 0.5 to about 10%, or about 1.2 to about 5% based on the total solids content of the ethylenically unsaturated monomer component mixture may be used in emulsion polymerization.

Scheme 5 - An acidic organic polymer reacts with 3-glycidyloxypropyltrialkozysilane (R can be a methyl or an ethyl group

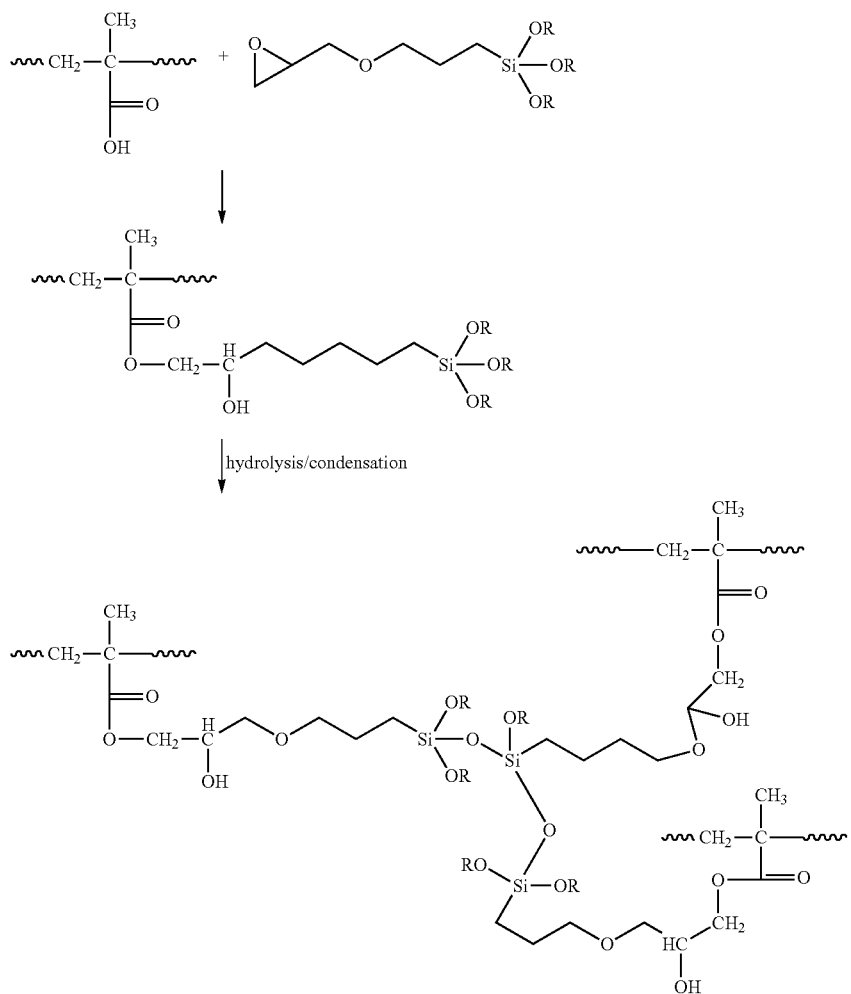

The hybrid latex emulsions of the present invention may have a relatively homogenous latex particle structure and/or an inhomogeneous latex particle structure. The hybrid latex particle structure may be controlled by the polymerization The hybrid latex emulsions used in the present invention can be prepared in some embodiments by techniques known in the art, such as without limitation, suspension polymerization, interfacial polymerization, and emulsion polymerization. Emulsion polymerization techniques for preparing latex emulsions from ethylenically unsaturated monomer components are well known in the polymer arts, and any conventional latex emulsion technique can be used, such as for non-limiting example, single and multiple shot batch processes, and continuous processes. In some embodiments, an ethylenically unsaturated monomer component (which may include and/or function as a crosslinker) is prepared and added in different stages to the polymerization vessel. The order of monomer addition (such as hydroxyl, organosilane and acid monomers) may be in the order from most hydrophobic to most hydrophilic, which can help to increase retort resistance, stabilize the latex particles and provide good wetting and adhesion on coated substrates. The ethylenically unsaturated monomer component (such as glycidyl methacrylate, glycerol dimethacrylate, 1,4-butanediol dimethacrylate, or a combination thereof) may include and/or function as a crosslinker in order to increase mechanic properties of the film and abrasion resistance. The ethylenically unsaturated monomer component may be varied during the course of the polymerization, such as, for non-limiting example, by altering the composition of the ethylenically unsaturated monomer component being fed into the vessel. Both single and multiple stage polymerization techniques can be used. In some embodiments, the hybrid latex emulsions are prepared using a seed monomer emulsion to control the number and the size of particles produced by emulsion polymerization. The particle size of the hybrid latex emulsion polymer particles is controlled in some embodiments by adjusting the initial surfactant charge.

There are at least several different ways to crosslink the hybrid latex emulsion in order to raise the molecular weight. In one embodiment, the hybrid latex emulsion can be crosslinked by at least one ethylenically unsaturated monomer component such as tripropylene glycol di(meth)acrylate, diethylene glycol di(meth)acrylate, ethyl glycol di(meth)acrylate, 1,6-hexanediol di(meth)acrylate, glycerol di(meth)acrylate, or a combination thereof. In another embodiment, if the hybrid latex emulsion has functional groups, such as methacrylate acid, the hybrid latex emulsion can be crosslinked by glycidyl groups, such as without limitation glycidyl methacrylate. In a third embodiment, if the hybrid latex emulsion has hydroxyl functional group monomers, such as without limitation hydroxypropyl methacrylate, the hybrid latex emulsion can be crosslinked with a phenolic resin to achieve suitable physical properties of the hybrid latex emulsion on a substrate.

Suitable crosslinkers can include, but are not limited to, urea-formaldehyde, phenol-formaldehyde, benzoguanamine formaldehyde, phenolic resins, and combinations thereof. In some embodiments of the invention, the ethylenically unsaturated monomer component may include and/or function as the crosslinker. In addition, the crosslinker may be added as a component separate from the ethylenically unsaturated monomer component. In some embodiments, the amount of the crosslinker is about 0.1 to about 30 wt % based on the total polymer solids content in the hybrid latex emulsion. The crosslinker may help improve chemical resistance and/or water blush resistance. However, if the amount of the crosslinker is too high, the film may lose flexibility.

The hybrid latex emulsion particle structures can be controlled by polymerization processes. The hybrid latex emulsion particles may be prepared by a series of consecutive emulsion polymerization sequences with different monomer types, where the second (third, etc.) stage monomer is polymerized in the presence of seed latex particles. These seed particles may be prepared in a separate step or formed in situ during the emulsion polymerization.

The ethylenically unsaturated monomer component can be composed of a single monomer or a mixture of monomers in various embodiments of the invention. When the emulsion is polymerized with at least one different ethylenically unsaturated monomer component to prepare the hybrid latex emulsion, at least one different ethylenically unsaturated monomer component may be added to the mixture of monomers. In some embodiments, the ethylenically unsaturated monomer component may include and/or function as the crosslinker. In some embodiments, the ethylenically unsaturated monomer component and/or the different ethylenically unsaturated monomer component may present in an amount up to about 60% based on total solids content of the ethylenically unsaturated monomer component mixture. The ethylenically unsaturated monomer component and the different ethylenically unsaturated monomer component may include, without limitation, an organosilane compound, an organosilane compound with one or more reactive organic groups and one or more hydrolysable inorganic groups, one or more vinyl monomers, acrylic monomers, allylic monomers, acrylamide monomers, vinyl esters including without limitation, vinyl acetate, vinyl propionate, vinyl butyrates, vinyl benzoates, vinyl isopropyl acetates, and similar vinyl esters, vinyl halides including without limitation, vinyl chloride, vinyl fluoride and vinylidene chloride, vinyl aromatic hydrocarbons including without limitation, styrene, methyl styrenes and similar lower alkyl styrenes, chlorostyrene, vinyl toluene, vinyl naphthalene, vinyl aliphatic hydrocarbon monomers including without limitation, alpha olefins such as for non-limiting example, ethylene, propylene, isobutylene, and cyclohexene, as well as conjugated dienes such as for non-limiting example, 1,3-butadiene, methyl-2-butadiene, 1,3-piperylene, 2,3 dimethyl butadiene, isoprene, cyclohexane, cyclopentadiene, dicyclopentadiene, as well as combinations thereof. Vinyl alkyl ethers may include without limitation, methyl vinyl ether, isopropyl vinyl ether, n-butyl vinyl ether, isobutyl vinyl ether, and combinations thereof. Acrylic monomers may include without limitation, monomers such as for non-limiting example, lower alkyl esters of acrylic or methacrylic acid having an alkyl ester portion other than methyl or ethyl containing about 3 to about 10 carbon atoms, as well as aromatic derivatives of acrylic and methacrylic acid, and combinations thereof. Acrylic monomers may include, for non-limiting example, butyl acrylate and methacrylate, propyl acrylate and methacrylate, 2-ethyl hexyl acrylate and methacrylate, cyclohexyl acrylate and methacrylate, decyl acrylate and methacrylate, isodecylacrylate and methacrylate, benzyl acrylate and methacrylate, various glycidyl ethers reacted with acrylic and methacrylic acids, hydroxyl alkyl acrylates and methacrylates such as without limitation, hydroxyethyl and hydroxy propyl acrylates and methacrylates, and amino acrylates and methacrylates, as well as combinations thereof.

In some embodiments, the ethylenically unsaturated monomer component and/or the different ethylenically unsaturated monomer component include at least one multiethylenically unsaturated monomer component effective to raise the molecular weight and to help crosslink the polymer. Non-limiting examples of multi-ethylenically unsaturated monomer components include allyl (meth)acrylate, tripropylene glycol di(meth)acrylate, diethylene glycol di(meth) acrylate, ethylene glycol di(meth)acrylate, 1,6-hexanediol di(meth)acrylate, 1,3-butylene glycol (meth)acrylate, polyalkylene glycol di(meth)acrylate, diallyl phthalate, trimethylolpropane tri(meth)acrylate, divinylbenzene, divinyltoluene, trivinylbenzene, divinylnaphthalene, and combinations thereof. In some embodiments, the multi-ethylenically unsaturated monomer component is present in an amount from about 0.1 to about 5% of the total solids content of the ethylenically unsaturated monomer component mixture.

In some embodiments of the invention, the ethylenically unsaturated monomer component and/or the different ethylenically unsaturated monomer component is mixed with a stabilizer in a carrier to form a monomer emulsion. Optionally, a base is present in the mixture. In some embodiments, the stabilizer is present in an amount from about 0.1% to 5.0% by weight polymeric solids.

The stabilizer may comprise a strong acid. Non-limiting examples of stabilizers include without limitation dodecylbenzene sulfonic acid, dinonylnaphthalene sulfonic acid, dinonylnaphthylenedisulfonic acid, bis(2-ethylhexyl)sulfosuccinic acid and the like, including combinations thereof. In some embodiments, a strong acid is an acid with a dissociation constant in aqueous solution (pKA) less than about 4. In some embodiments, the strong acid has a hydrophobe attached to the acid. In some embodiments, the strong acid has at least about six carbon atoms.

Non-limiting examples of a base include ammonia, dimethylethanolamine, 2-dimethylamino-2-methyl-1-propanol, and combinations thereof. In some embodiments, the base is present in an amount of about 50% to 100% mole to mole of stabilizer.

In some embodiments, the carrier includes, without limitation, water, a water soluble cosolvent, or a combination thereof. The carrier is present in an amount of about 30 to about 70 wt % of the hybrid latex emulsion in some embodiments.

In some embodiments of the invention, the monomer emulsion and/or the hybrid latex emulsion is reacted with one or more initiators. The initiator may include, for non-limiting example, an initiator which thermally decomposes at the polymerization temperature to generate free radicals. Examples of initiators include, without limitation, both water-soluble and water-insoluble species, as well as combinations thereof. Examples of free radical-generating initiators include, for non-limiting example, persulfates, such as without limitation, ammonium or alkali metal (potassium, sodium or lithium) persulfate, azo compounds such as without limitation, 2,2'-azo-bis(isobutyronitrile), 2,2'-azo-bis(2,4-dimethylvaleronitrile), and 1-t-butyl-azocyanocyclohexane), hydroperoxides such as without limitation, t-butyl hydroperoxide and cumene hydroperoxide, peroxides such as without limitation, benzoyl peroxide, caprylyl peroxide, di-t-butyl peroxide, ethyl 3,3'-di(t-butylperoxy) butyrate, ethyl 3,3'-di(t-amylperoxy) butyrate, t-amylperoxy-2-ethyl hexanoate, and t-butylperoxy pivilate, peresters such as without limitation, t-butyl peracetate, t-butyl perphthalate, and t-butyl perbenzoate, percarbonates, such as without limitation, di(1-cyano-1-methylethyl)peroxy dicarbonate, perphosphates, and the like, as well as combinations thereof.

In some embodiments, the initiator is used alone or as the oxidizing component of a redox system, which may include, without limitation, a reducing component such as, for non-limiting example, ascorbic acid, maleic acid, glycolic acid, oxalic acid, lactic acid, thioglycolic acid, or an alkali metal sulfite, such as without limitation, a hydrosulfite, hyposulfite or metabisulfite, such as without limitation, sodium hydrosulfite, potassium hyposulfite and potassium metabisulfite, or sodium formaldehyde sulfoxylate, as well as combinations thereof. The reducing component can be referred to as an accelerator or a catalyst activator.

The initiator and accelerator, which can be referred to as an initiator system, may be used in some embodiments in proportions from about 0.001% to about 5% based on the weight of ethylenically unsaturated monomer component to be copolymerized. Promoters such as without limitation, chloride and sulfate salts of cobalt, iron, nickel or copper are optionally employed in amounts from about 2 to about 200 ppm in some embodiments. Non-limiting example of redox catalyst systems include, without limitation, tert-butyl hydroperoxide/sodium formaldehyde sulfoxylate/Fe(II), ammonium persulfate/sodium bisulfate/sodium hydrosulfite/Fe(II), and combinations thereof. In some embodiments, the polymerization temperature is from about room temperature to about 90° C., and the temperature can be optimized for the initiator system employed, as is conventional.

In some embodiments of the invention, aggregation of polymeric latex particles may be limited by including a stabilizing surfactant during polymerization. For non-limiting example, the growing latex particles may be stabilized during emulsion polymerization by one or more surfactants such as, without limitation, dodecylbenzene sulfonic acid, an anionic or nonionic surfactant, or a combination thereof. Other types of stabilizing agents can be used in some embodiments, such as without limitation, protective colloids. Generally speaking, conventional anionic surfactants with metal, nonionic surfactants containing polyethylene chains and other protective colloids tend to impart water sensitivity to the resulting films. In some embodiments of the invention, it is desirable to minimize or avoid the use of these conventional anionic and nonionic surfactants. In some embodiments, the stabilizing surfactant is employed during seed polymerization.

Chain transfer agents are used in some embodiments of the invention to help control the molecular weight of the hybrid latex emulsion. Non-limiting examples of chain transfer agents include mercaptans, polymercaptans, polyhalogen compounds, alkyl mercaptans such as without limitation, ethyl mercaptan, n-propyl mercaptan, n-butyl mercaptan, isobutyl mercaptan, t-butyl mercaptan, n-amyl mercaptan, isoamyl mercaptan, t-amyl mercaptan, n-hexyl mercaptan, cyclohexyl mercaptan, n-octyl mercaptan, n-decyl mercaptan, n-dodecyl mercaptan, mercapto carboxylic acids and their esters, such as without limitation, methyl mercaptopropionate and 3-mercaptopropionic acid, alcohols such as without limitation, isopropanol, isobutanol, lauryl alcohol and t-octyl alcohol, halogenated compounds such as without limitation, carbon tetrachloride, tetrachloroethylene, tricholoro-bromoethane, and combinations thereof. In some embodiments, up to about 10% by weight of a chain transfer agent is used, based on the weight of the ethylenically unsaturated monomer component mixture. The hybrid latex emulsion molecular weight may be controlled in some embodiments by controlling the ratio of initiator to the ethylenically unsaturated monomer component.

In some embodiments, the initiator system and/or chain transfer agent is dissolved or dispersed in separate fluid mediums or in the same fluid medium, and then gradually added to the polymerization vessel. In some embodiments, the ethylenically unsaturated monomer component (either neat or dissolved or dispersed in a fluid medium) is added simultaneously with the catalyst and/or the chain transfer agent. The catalyst may be added to the polymerization mixture to "chase" residual monomer after polymerization has been substantially completed to polymerize the residual monomer.

In some embodiments, an additional monomer mixture of an ethylenically unsaturated monomer component and a stabilizer is added to the monomer emulsion. Optionally, a base is present in the additional monomer mixture. The additional monomer mixture can be added to the monomer emulsion in some embodiments prior to addition of the initiator, after addition of the initiator, or both before and after addition of the initiator. The compositions of the ethylenically unsaturated monomer component, stabilizer and base in the additional monomer mixture can be the same as or different than the compositions of these components in the monomer emulsion.

The hybrid latex emulsion may be reacted with a neutralizer in some embodiments of the invention to form a coating composition. In some embodiments, the reaction occurs in the presence of a solvent with or without a phenolic crosslinker, such as without limitation Sakuranomiya Chemical Company's MC-16, Cytec's EP-560, PH2028, PH2013/65B, PR899/60MPC, Hexion's PF6535LB, SI Group's SFC112/65, Ruters's 7700 LB, or a combination thereof. Solvents may include without limitation xylene, benzene, ethyl benzene, toluene, alkoxy alkanols, methanol, ethanol, propanol, butanol, alkyl ethers of ethylene, alkyl ethers of propylene glycol, ethylene glycol monobutyl ether, ethylene glycol ethyl ether, diethylene glycol monobutyl ether, a ketone, an aromatic solvent, an ester solvent, a hydroxyl functional solvent, and combinations thereof. The amount of the solvent in the coating composition may be up to about 90% by weight of the polymeric solids, or from about 20% to about 45% by weight of the liquid coating composition. If water is present, the amount of water in the coating composition may range from about 20% to about 50%.

In some embodiments, the neutralizer includes, without limitation, ammonia, a tertiary amine, such as, for non-limiting example, dimethylethanolamine, 2-dimethylamino-2-methyl-1-propanol, tributylamine, or a combination thereof. For non-limiting example, the neutralizer may be employed in an amount up to about 100% based on of the amount of acid to be neutralized in the system.

The glass transition temperature (Tg) of the composition may depend on the total monomer composition and may contribute to blush resistance, lube bloom and abrasion resistance. For non-limiting example, if the polymer has increased amounts of methacrylic acid, then the polymer may have a higher Tg. In some embodiments of the invention, the Tg is from about 5 to about 50° C. If the Tg is too low, the film may be too soft and may have insufficient abrasion resistance. If the Tg is too high, the film may wrinkle and may not have enough flexibility which may decrease film performance. The cure temperature may be about 200 to about 300° C.

The hybrid latex emulsions and the coating compositions of the invention can include conventional additives known to those skilled in the art, such as without limitation, additives to control foam, reduce equilibrium and dynamic surface tension, or to control rheology and surface lubricity. Amounts can vary depending on desired coating application and performance in any manner known to those skilled in the art.

One or more coating compositions of the invention may be applied to a substrate in some embodiments, such as for non-limiting example, cans, metal cans, beer and beverage easy-open-ends, packaging, containers, receptacles, can ends, or any portions thereof used to hold or touch any type of food or beverage. In some embodiments, one or more coating compositions are applied in addition to the coating composition of the present invention, such as for non-limiting example, a prime coat may be applied between the substrate and a coating composition of the present invention.

The coating compositions can be applied to substrates in any manner known to those skilled in the art. In some embodiments, the coating compositions are sprayed onto a substrate. When spraying, the coating composition may contain, for non-limiting example, from about 10 to about 30% by weight of the polymeric solids relative to about 70 to about 90% water including other volatiles such as, without limitation, minimal amounts of solvents, if desired. For some applications, typically those other than spraying, the aqueous polymeric dispersions may contain, for non-limiting example, from about 20 to about 60% by weight of the polymer solids. Organic solvents may be utilized in some embodiments to facilitate spray or other application methods and such solvents may include, without limitation, n-butanol, 2-butoxy-ethanol-1, xylene, toluene, and mixtures thereof. In some embodiments, n-butanol is used in combination with 2-butoxy-ethanol-1. The coating compositions of the present invention may be pigmented and/or opacified with known pigments and opacifiers in some embodiments. For many uses, including food use for non-limiting example, the pigment may be titanium dioxide.

The resulting aqueous coating compositions may be applied in some embodiments by conventional methods known in the coating industry. Thus, for non-limiting example, spraying, rolling, dipping, and flow coating application methods can be used for both clear and pigmented films. In some embodiments, after application onto a substrate, the coating may be cured thermally at temperatures in the range from about 215 to about 250° C., and alternatively higher for a time sufficient to effect complete curing as well as volatilizing any fugitive components therein.

For substrates intended as beverage containers, the coating compositions may be applied in some embodiments at a rate in the range from about 0.5 to about 15 milligrams per square inch of polymer coating per square inch of exposed substrate surface. In some embodiments, the water-dispersible coating composition may be applied at a thickness from about 1 to about 25 microns.

Compared to conventional epoxy-acrylic commercial materials, the present invention offers simplicity of manufacture because one single polymer may be used in the emulsion polymerization process. It was surprising that desired properties could be achieved by sol-gel crosslinking reactions. One unique aspect of the invention is that an organosilane compound (such as MPS or 3-glycidyloxypropyltrimethoxysilane) can be used in the hybrid latex emulsion to contribute to hybrid latex emulsions and coating compositions having acceptable blush resistance, abrasion resistance, blister resistance, hardness and scratch resistance. Additional phenolic resins or crosslinkers can be blended into the hybrid latex emulsions to enhance film properties. Coating compositions of the present invention can be applied on panels and during fabrication of beverage easy-open-ends for packaging coating applications.

For substrates intended as beverage easy-open-ends, the coating are applied in some embodiments at a rate in the range from about 1.5 to about 15 milligrams of polymer coating per square inch of exposed substrate surface. Conventional packaging coating compositions are applied to metal at about 232 to about 247° C. Some of the coating compositions of the current invention achieve good results at about 230° C. or below, such as at about 210° C. or below. This decreased temperature provides an energy savings to the coater, and it may allow the use of different alloys, such as tin-plated steel used for easy-open-ends. This also allows to recycle the ends together with the can body.

EXAMPLES

The invention will be further described by reference to the following non-limiting examples. It should be understood that variations and modifications of these examples can be made by those skilled in the art without departing from the spirit and scope of the invention.

Gel content was measured as follows:

1. The sample was placed in a PTFE 10 cc centrifuge tube, and 10 cc's of unstabilized THF was added. Both the tube and the sample weights were known.

2. The sample solution solubilized overnight, and the following day it was supercentrifuged for 5 hours at 20,000 rpm using a Beckman-Coulter (Avanti J-E).

3. As quickly as possible after the end of the supercentrifugation step, the tubes were removed and the gel 'type' was observed. The gels were moveable and difficult to see clearly (not well-pelletized). Since the materials either did not pelletize well or were partially pelletized, it was recognized that there needed to be a balance between removing as much supernate as possible without also removing the gel. About 8.5 to about 9.5 cc of supernate was pipetted off, leaving some supernate containing soluble material behind.

4. The 'pipetted' supernate was filtered through a 0.45 μm syringe filter prior to GPC analysis.

5. The PTFE tube with insoluble material was dried overnight in a hood, and then heated under vacuum the following day for 4-5 hours at 62° C. to drive off any residual THF.

6. The dried insolubles and the tube weight was taken and the weight of the tube itself was subtracted.

% Gel Content Calculation:

(Weight of Insolubles (g)×100)/(Sample weight (g)× NV)=% Gel Content

Blush resistance measures the ability of a coating to resist attack by various solutions. Typically, blush is measured by the amount of water absorbed into a coated film. When the film absorbs water, it generally becomes cloudy or looks white. The coating compositions were evaluated with deionized water retort (90 minutes immersed into water at 250° F.). Retort blush was measured visually on a scale of 0-5. A blush of 0 means that there is no blush. A blush of 5 means that the film is completely white.

Beaded Ericksen cup fabrication measures the ability of a coated substrate to retain its integrity as it simulated the formation process to produce a beverage can end. It is a measure of the presence of cracks or fractures in the beads. 1×1 inch drown cups were made by Ericksen Cupper.

Adhesion testing was performed on the beaded Ericksen cups to assess whether the coating adheres to the cups. The adhesion test was performed according to ASTM D 3359-Test Method B, using SCOTCH 610 tape, available from 3M Company of Saint Paul, Minn. Adhesion is generally rated on a scale of 0-5 where a rating of "0" indicated no adhesion failure, a rating of "5" indicates that film was completely off the substrate.

Blisters were measured by MEIJI Techno Microscopes and referenced by ASTM D714. The blisters were rated by none, a few and dense in this application.

Example 1

Comparative

The present invention can use a sol-gel process to prepare a highly intermingled organic-inorganic hybrid latex emulsion for easy-open-end can coating compositions. Silica particles can effectively improve the blush resistance and the abrasion resistance of the coating composition. Example 1 is a comparative example because it does not include a methacrylic silane monomer.

The following acrylate latex was prepared with 6 wt % (based on total monomer weight) of 1.3-glycerol dimethacrylate (GDMA) without using the organosilane compound 3-methacryloxypropyltrimethoxysilane (MPS):

|   |   | weight % |
|---|---|---|
| A) | Deionized water | 42.36 |
| B) | Dodecylbenzene sulfonic acid (DDBSA) | 0.077 |
| B) | Deionized water | 0.359 |
| B) | Ammonium hydroxide (28%) | 0.011 |
| C) | Dodecylbenzene sulfonic acid | 0.154 |
| C) | Deionized water | 15.44 |
| C) | Ammonium hydroxide (28%) | 0.022 |
| D) | 1,3-glycerol dimethacrylate (GDMA) | 2.15 |
| D) | Hydroxypropyl methacrylate (HPMA) | 1.80 |
| D) | Ethyl acrylate (EA) | 16.87 |
| D) | Methyl methacrylate (MMA) | 14.04 |
| D) | Methacrylic acid (MMA) | 1.436 |
| E) | Deionized water | 1.38 |
| E) | Ammonia persulfate | 0.18 |
| F) | Deionized wate | 2.87 |
| G) | Ascorbic acid | 0.036 |
| G) | Deionized water | 0.359 |
| G) | Iron (II) sulfate | 0.00001 |
| H) | t-butyl perbenzoate | 0.09 |
| H) | Deionized water | 0.359 |
| I) | Dimethyl ethanolamine | 0.36 |
| I) | Deionized water | 3.6 |

Group A and B were charged into a flask and heated to 77° C. under a nitrogen sparge. Agitation was turned on. The nitrogen sparge was changed to a blanket when the temperature reached 77° C.

A pre-emulsion was used in polymerization to aid in transport of the hydrophobic monomers through monomer droplets via surfactants. The key to make a good pre-emulsion was to ensure the order of monomer addition goes from most hydrophobic first to most hydrophilic last. If this guideline was not followed the pre-emulsion will most likely fail.

The pre-emulsion was prepared by adding the surfactant of group C with stirring. Group D was added to the mixture in the order of EA, MMA and 3-methacryloxypropyltrimethoxysilane, GDMA, HPMA and MAA. The mixture was stirred for 5 minutes. Stability was checked by taking a sample and checking for phase separation by mixing at moderate speed. The mixture speed was increased to eliminate any phase separation. If phase separation occurred, the speed was increased to "whip" up the mixture.

Next, 66 grams of C and D were added to the flask at 77° C. and held for 5 minutes. Next, Group E was fed at 77° C. After temperature passed the peak temperature, the temperature was raised to 79.8° C. The remainder of C and D were then pumped into the flask over 180 minutes. F was used to wash the pump while it was pumped into the flask. The batch was held for 15 minutes at 80° C. Next, G was added and held for 5 minutes. The reactor was then cooled to 70° C. H was added over 20 minutes and held for 15 minutes at 70°

C. Next, I was added and over 30 minutes at 40° C. The batch was cooled to 38° C. and filtered.

Example 2

Example 1 was repeated with the compounds identified below. 0.5 wt % (based on total monomer weight) of 3-methacryloxypropyltrimethoxysilane (MPS) was added to group D.

| | | weight % |
|---|---|---|
| A) | Deionized water | 42.534 |
| B) | Dodecylbenzene sulfonic acid (DDBSA) | 0.077 |
| B) | Deionized water | 0.360 |
| B) | Ammonium hydroxide (28%) | 0.011 |
| C) | Dodecylbenzene sulfonic acid | 0.154 |
| C) | Deionized water | 15.44 |
| C) | Ammonium hydroxide (28%) | 0.022 |
| D) | 1,3-glycerol dimethacrylate (GDMA) | 2.15 |
| D) | Hydroxypropyl methacrylate (HPMA) | 1.80 |
| D) | Ethyl acrylate (EA) | 16.87 |
| D) | Methyl methacrylate (MMA) | 13.86 |
| D) | Methacrylic acid (MMA) | 1.436 |
| D) | 3-methacryloxypropyltrimethoxysilane (Dow Corning Z-6030) | 0.18 |
| E) | Deionized water | 1.38 |
| E) | Ammonia persulfate | 0.18 |
| F) | Deionized wate | 2.87 |
| G) | Ascorbic acid | 0.036 |
| G) | Deionized water | 0.359 |
| G) | Iron (II) sulfate | 0.00001 |
| H) | t-butyl perbenzoate | 0.09 |
| H) | Deionized water | 0.359 |
| I) | Dimethyl ethanolamine | 0.36 |
| I) | Deionized water | 3.6 |

Example 3

Example 1 was repeated with the compounds identified below. 1.1 wt % (based on total monomer weight) of 3-methacryloxypropyltrimethoxysilane (MPS) was added to group D.

| | | weight % |
|---|---|---|
| A) | Deionized water | 42.36 |
| B) | Dodecylbenzene sulfonic acid (DDBSA) | 0.077 |
| B) | Deionized water | 0.359 |
| B) | Ammonium hydroxide (28%) | 0.011 |
| C) | Dodecylbenzene sulfonic acid | 0.154 |
| C) | Deionized water | 15.44 |
| C) | Ammonium hydroxide (28%) | 0.022 |
| D) | 1,3-glycerol dimethacrylate (GDMA) | 2.15 |
| D) | Hydroxypropyl methacrylate (HPMA) | 1.80 |
| D) | Ethyl acrylate (EA) | 16.87 |
| D) | Methyl methacrylate (MMA) | 13.64 |
| D) | Methacrylic acid (MMA) | 1.436 |
| D) | 3-methacryloxypropyltrimethoxysilane (Dow Corning Z-6030) | 0.4 |
| E) | Deionized water | 1.38 |
| E) | Ammonia persulfate | 0.18 |
| F) | Deionized wate | 2.87 |
| G) | Ascorbic acid | 0.036 |
| G) | Deionized water | 0.359 |
| G) | Iron (II) sulfate | 0.00001 |
| H) | t-butyl perbenzoate | 0.09 |
| H) | Deionized water | 0.359 |
| I) | Dimethyl ethanolamine | 0.36 |
| I) | Deionized water | 3.6 |

Example 4

Example 1 was repeated with the compounds identified below, except that GDMA was not present. 1.1 wt % (based on total monomer weight) of 3-methacryloxypropyltrimethoxysilane (MPS) was added to group D.

| | | weight % |
|---|---|---|
| A) | Deionized water | 42.36 |
| B) | Dodecylbenzene sulfonic acid (DDBSA) | 0.077 |
| B) | Deionized water | 0.359 |
| B) | Ammonium hydroxide (28%) | 0.011 |
| C) | Dodecylbenzene sulfonic acid | 0.154 |
| C) | Deionized water | 15.44 |
| C) | Ammonium hydroxide (28%) | 0.022 |
| D) | Hydroxypropyl methacrylate (HPMA) | 1.80 |
| D) | Ethyl acrylate (EA) | 17.952 |
| D) | Methyl methacrylate (MMA) | 14.72 |
| D) | Methacrylic acid (MMA) | 1.436 |
| D) | 3-methacryloxypropyltrimethoxysilane (Dow Corning Z-6030) | 0.4 |
| E) | Deionized water | 1.38 |
| E) | Ammonia persulfate | 0.18 |
| F) | Deionized wate | 2.87 |
| G) | Ascorbic acid | 0.036 |
| G) | Deionized water | 0.359 |
| G) | Iron (II) sulfate | 0.00001 |
| H) | t-butyl perbenzoate | 0.09 |
| H) | Deionized water | 0.359 |
| I) | Dimethyl ethanolamine | 0.36 |
| I) | Deionized water | 3.6 |

Example 5

Example 1 was repeated with the compounds identified below, except that GDMA was not present. 2.0 wt % (based on total monomer weight) of 3-methacryloxypropyltrimethoxysilane (MPS) was added to group D.

| | | weight % |
|---|---|---|
| A) | Deionized water | 42.36 |
| B) | Dodecylbenzene sulfonic acid (DDBSA) | 0.077 |
| B) | Deionized water | 0.359 |
| B) | Ammonium hydroxide (28%) | 0.011 |
| C) | Dodecylbenzene sulfonic acid | 0.154 |
| C) | Deionized water | 15.44 |
| C) | Ammonium hydroxide (28%) | 0.022 |
| D) | Hydroxypropyl methacrylate (HPMA) | 1.80 |
| D) | Ethyl acrylate (EA) | 17.894 |
| D) | Methyl methacrylate (MMA) | 14.673 |
| D) | Methacrylic acid (MMA) | 1.431 |
| D) | 3-methacryloxypropyltrimethoxysilane (Dow Corning Z-6030) | 0.72 |
| E) | Deionized water | 1.38 |
| E) | Ammonia persulfate | 0.18 |
| F) | Deionized wate | 2.87 |
| G) | Ascorbic acid | 0.036 |
| G) | Deionized water | 0.359 |
| G) | Iron (II) sulfate | 0.00001 |
| H) | t-butyl perbenzoate | 0.09 |
| H) | Deionized water | 0.359 |
| I) | Dimethyl ethanolamine | 0.36 |
| I) | Deionized water | 3.6 |

Example 6

Example 1 was repeated with the compounds identified below the procedure for group I was not used. 5.0 wt % (based on total monomer weight) of 3-glycidyloxypropyltrimethoxysilane (Dynasylan Glymo®) was added to group D.

|   |   | weight % |
|---|---|---|
| A) | Deionized water | 38.73 |
| B) | Dodecylbenzene sulfonic acid (DDBSA) | 0.09 |
| B) | Deionized water | 0.359 |
| B) | Ammonium hydroxide (28%) | 0.013 |
| C) | Dodecylbenzene sulfonic acid | 0.18 |
| C) | Deionized water | 19.28 |
| C) | Ammonium hydroxide (28%) | 0.026 |
| D) | 1,3-glycerol dimethacrylate (GDMA) | 2.16 |
| D) | Hydroxypropyl methacrylate (HPMA) | 1.80 |
| D) | Ethyl acrylate (EA) | 16.57 |
| D) | Methyl methacrylate (MMA) | 14.05 |
| D) | Methacrylic acid (MMA) | 1.44 |
| D) | 3-glycidyloxypropyltrimethoxysilane (Dynasylan Glymo ®) | 1.8 |
| E) | Deionized water | 1.38 |
| E) | Ammonia persulfate | 0.18 |
| F) | Deionized wate | 2.87 |
| G) | Ascorbic acid | 0.036 |
| G) | Deionized water | 0.359 |
| G) | Iron (II) sulfate | 0.00001 |
| H) | t-butyl perbenzoate | 0.09 |
| H) | Deionized water | 0.359 |

Example 7

Summary of the Latex Emulsions Examples 1-6

The latexes emulsions of Examples 1-6 were all made using an emulsion polymerization process. The properties are summarized in Table 1.

TABLE 1

(the latex emulsions of Examples 1-6)

| Latex | % MPS | % GLYMO | % GDMA | Gel content | Particle size-volume weight mean | Reactor cleanness |
|---|---|---|---|---|---|---|
| Example 1 | 0 | 0 | 6% | 50% | 101 nm | OK |
| Example 2 | 0.5% | 0 | 6% | 88% | 102 nm | clean |
| Example 3 | 1.1% | 0 | 6% | 99.7% | 117 nm | Very clean |
| Example 4 | 1.1% | 0 | 0 | 94% | 107 nm | Very clean |
| Example 5 | 2.0% | 0 | 0 | 94.7% | 120 nm | OK |
| Example 6 | 0 | 5% | 6% | 75% | 98 nm | Very clean |

Example 1 had 6% of 1,3-glycerol dimethacrylate (GDMA) which can crosslink latex emulsion polymers. The gel content was about 50%. Example 2 had 6% of 1,3-glycerol dimethacrylate (GDMA) and 0.5% of 3-methacryloxypropyltrimethoxysilane (MPS). The gel content increased to 88%. Example 3 had 1.1% of 3-methacryloxypropyltrimethoxysilane (MPS) and 6% of GDMA. The gel content of example increased to 99.7%. Example 4 had 1.1% of 3-methacryloxypropyltrimethoxysilane (MPS) without GDMA. The gel content was about 94%. Example 5 had 2.0% of 3-methacryloxypropyltrimethoxysilane (MPS) without GDMA. The gel content did not increase compared to Example 4. Example 6 had 5% of 3-glycidyloxypropyltrimethoxysilane (Dynasylan Glymo®) and 6% of 1,3-glycerol dimethacrylate (GDMA). The gel content of was higher than Example 1 and lower than Examples 2-5.

The results demonstrate that 3-methacryloxypropyltrimethoxysilane (MPS) was more effective to increase particle gel content. A higher gel content provides better blush resistance and chemical resistance for the hybrid latex emulsions.

The cross-linking reaction was dependent on the MPS concentration. The larger the amount of MPS in the monomer feed, the higher the condensation degree of the silica-based network (Examples 2-4). However, when the MPS concentration was too high as in Example 5, the degree of condensation might have decreased because MPS has bulky branched hydrophilic groups as well as stable alkyl silyl groups, which could not be hydrolyzed and could prevent excessive crosslinking and coagulation of monomer during the emulsion polymerization.

Example 5 had a small amount of grit in the reactor.

The particle size of all Examples was small (<120 nm).

The results shown in Table 1 relate to a sol-gel process used to prepare highly intermingled organic-inorganic hybrid latex emulsions. Silica particles can more effectively improve the chemical and water resistance of the hybrid latex emulsions. Methacrylic silane monomers, such as 3-methacryloxypropyltrimethoxysilane (between 0.5%-2%), can be copolymerized with acrylate monomers to form an interpenetrated network latex emulsion. The gel content of hybrid latex emulsions with 1.1% silane methacrylate was increased to 99.7% from 50%. The water blush resistance of the hybrid latex emulsions also increased.

Dynasylan Glymo is a bifunctional organsilane possessing a reactive epoxide and hydrozable inorganic methoxysilyl groups. The epoxide can react with functional groups such as acid group and hydroxyl group in the polymer chain. Hydrolysis of methoxy groups of Dynasylan Glymo in latex emulsion gives silanol groups which can subsequently condense with silanol groups on the nanosilica to from siloxane. However, the gel content of example 6 is lower than MPS latex. The catalysts such as amine might be needed to accelerate crosslinking reaction. Dynasylan Glyeo can also be used in emulsion polymerization.

Example 8

Preparation of Coating Compositions

The six latex samples prepared in Examples 1-6 were formulated with various additives such as solvents and waxes. The coating formulations are summarized below:

Resin (Examples 1-6): 102.8 grams

Wax (Lanco Glido 6502 from Lubrizol): 5.4 grams

Propylene glycol: 8.0 grams

Deionized water: 34.1 grams

Ethylene glycol monobutyl ether: 16.0 grams

Phenolic resin: 4.2 grams

Dimethyl ethanolamine: 0.8 grams

The coating compositions were coated on 211 TFS substrates and baked for 9 seconds at a metal peak temperature 234° C. The coating weight ranges were about 2.0-2.7 msi (milligram per square inch). The test results are summarized in Table 2 below. The coating films prepared from Examples 3 and 4 showed excellent flexibility/adhesion, blush resistance and blister resistance with good cure response at short dwell times on both aluminum and 211 TFS substrates. Hybrid latex emulsions with 3-methacryloxypropyltrimethoxysilane (MPS) were more effective to increase particle gel content and coating film performance.

TABLE 2

Coating composition performance

| Coatings | Blush Resistance (Immersed 90 mins at 250° F. retort) | Blister | Adhesion | Beaded Erickson Cup |
|---|---|---|---|---|
| Example 1 | 3 | Dense | 0 | No cracks or fractures |
| Example 2 | 2 | Dense | 0 | No cracks or fractures |
| Example 3 | <1 | A few | 0 | No cracks or fractures |
| Example 4 | <1 | A few | 0 | No cracks or fractures |
| Example 5 | 2 | Medium | 0 | No cracks or fractures |
| Example 6 | 2 | Medium | 0 | No cracks or fractures |

What is claimed is:

1. A coating composition comprising a hybrid latex emulsion comprising the product of a reaction between an initiator and a monomer emulsion, the monomer emulsion comprising a mixture of an ethylenically unsaturated monomer component and a stabilizer;
wherein the ethylenically unsaturated monomer component comprises an organosilane compound and at least one ethylenically unsaturated monomer that is not an organosilane compound;
wherein the coating composition has a gel content of greater than 50%; and
wherein the organosilane compound comprises a methoxysilane or an ethoxysilane selected from 3-methacryloxypropyltrimethoxysilane, 3-glycidyl-oxypropyltriethoxysilane, 3-glycidyloxypropyltrimethoxysilane, amino-ethyl-aminopropyltrimethoxysilane, vinyltriethoxysilane, tetra-methoxysilane, tetraethoxysilane, or methyltrimethoxysilane.

2. The coating composition of claim 1, wherein the organosilane compound is present in an amount from about 0.1 to about 30% based on total solids of the hybrid latex emulsion.

3. The coating composition of claim 1, wherein the organosilane compound comprises a reactive organic group and a hydrolysable inorganic alkoxysilane.

4. The coating composition of claim 1, wherein the stabilizer includes at least one of dodecylbenzene sulfonic acid, dinonylnaphthalene sulfonic acid, dinonylnaphthylenedisulfonic acid, or bis(2-ethylhexyl)sulfosuccinic acid.

5. The coating composition of claim 1, wherein the hybrid latex emulsion further comprises a crosslinker.

6. The coating composition of claim 1, wherein the ethylenically unsaturated monomer component includes at least one of tripropylene glycol di(meth)acrylate, diethylene glycol di(meth)acrylate, ethyl glycol di(meth)acrylate, 1,6-hexanediol di(meth)acrylate, glycerol di(meth)-acrylate, glycidyl methacrylate, 1,4-butanediol di(meth)acrylate, hydroxypropyl (meth)acrylate, (meth)acrylic acid, a vinyl monomer, an acrylic monomer, an allylic monomer, an acrylamide monomer, a vinyl ester, a vinyl halide, a vinyl aromatic hydrocarbon, a vinyl aliphatic hydrocarbon monomer, a vinyl alkyl ether, an acrylic monomer, 1,3-butylene glycol (meth)acrylate, polyalkylene glycol di(meth)acrylate, diallyl phthalate, trimethylolpropane tri(meth)acrylate, divinylbenzene, divinyltoluene, trivinylbenzene, or divinylnaphthalene.

7. The coating composition of claim 1, wherein the hybrid latex emulsion is formed using a crosslinker that includes at least one of a phenolic resin, urea-formaldehyde, phenol-formaldehyde, or benzoguanamine formaldehyde.

8. A substrate coated with the coating composition of claim 1.

9. The substrate of claim 8, wherein the substrate is an end of a beer or beverage container.

10. The coating composition of claim 1, wherein the hybrid latex emulsion is a hybrid core-shell latex emulsion.

11. A method of forming a coating composition, the method comprising:
a) mixing an ethylenically unsaturated monomer component and a stabilizer in a carrier to form a monomer emulsion; and
b) reacting the monomer emulsion with an initiator to form the hybrid latex emulsion,
wherein the ethylenically unsaturated monomer component comprises an organosilane compound and at least one ethylenically unsaturated monomer which is not an organosilane compound, and wherein the coating composition has a gel content of greater than 50%; and
wherein the organosilane compound comprises a methoxysilane or an ethoxysilane selected from the group comprising 3-methacryloxypropyltrimethoxysilane, 3-glycidyl-oxypropyltriethoxysilane, 3-glycidyloxypropyltrimethoxysilane, amino-ethyl-aminopropyltrimethoxysilane, vinyltriethoxysilane, tetra-methoxysilane, tetraethoxysilane, or methyltrimethoxysilane.

12. The method of claim 11, wherein the organosilane compound is present in an amount from about 0.1 to about 30% based on total solids of the hybrid latex emulsion.

13. The method of claim 11, wherein the organosilane compound comprises a reactive organic group and a hydrolysable inorganic alkoxysilane.

14. The method of claim 11, wherein the stabilizer includes at least one of dodecylbenzene sulfonic acid, dinonylnaphthalene sulfonic acid, dinonylnaphthylenedisulfonic acid, or bis(2-ethylhexyl)sulfosuccinic acid.

15. The method of claim 11, wherein the hybrid latex emulsion further comprises a crosslinker.

16. The method of claim 11, wherein the ethylenically unsaturated monomer component includes at least one of tripropylene glycol di(meth)acrylate, diethylene glycol di(meth)acrylate, ethyl glycol di(meth)acrylate, 1,6-hexanediol di(meth)acrylate, glycerol di(meth)-acrylate, glycidyl methacrylate, 1,4-butanediol di(meth)acrylate, hydroxypropyl (meth)acrylate, (meth)acrylic acid, a vinyl monomer, an acrylic monomer, an allylic monomer, an acrylamide monomer, a vinyl ester, a vinyl halide, a vinyl aromatic hydrocarbon, a vinyl aliphatic hydrocarbon monomer, a vinyl alkyl ether, an acrylic monomer, 1,3-butylene glycol (meth)acrylate, polyalkylene glycol di(meth)acrylate, diallyl phthalate, trimethylolpropane tri(meth)acrylate, divinylbenzene, divinyltoluene, trivinylbenzene, or divinylnaphthalene.

17. A coating composition having a gel content of greater than 50% and including an organosilane-acrylate copolymer hybrid latex emulsion that is the product of emulsion polymerization or mini-emulsion polymerization of an initiator and a monomer emulsion formed from a mixture in a carrier of a stabilizer, an organosilane compound, and an acrylate monomer; wherein the organosilane compound comprises a methoxysilane or an ethoxysilane selected from the group comprising 3-methacryloxypropyltrimethoxysilane, 3-glycidyl-oxypropyltriethoxysilane, 3-glycidyloxypropyltrimethoxysilane, amino-ethyl-aminopropyltrimethoxysilane, vinyltriethoxysilane, tetra-methoxysilane, tetraethoxysilane, or methyltrimethoxysilane.

18. The coating composition of claim 1, wherein the monomer emulsion mixture is prepared by consecutive emulsion polymerization through the addition of each component of the monomer emulsion mixture order of increasing hydrophilicitya to confer increased retort resistance, stabilization of latex particles, and increased wetting and adhesion to the coating composition.

19. The coating composition of claim 1, wherein the monomer emulsion mixture is prepared by mixing each component of the monomer emulsion mixture in an order of increasing hydrophilicity prior to polymerization; and wherein the monomer emulsion mixture is polymerized to confer increased retort resistance, stabilization of latex particles, and increased wetting and adhesion to the coating composition.

\* \* \* \* \*